April 22, 1947.  C. R. HANNA ET AL  2,419,210
POSITION REGULATOR
Filed March 31, 1943  6 Sheets-Sheet 5

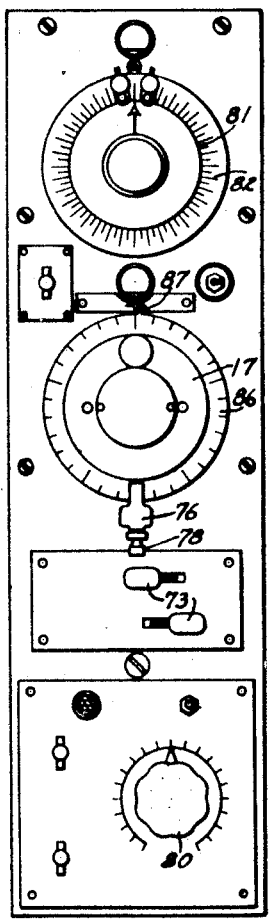
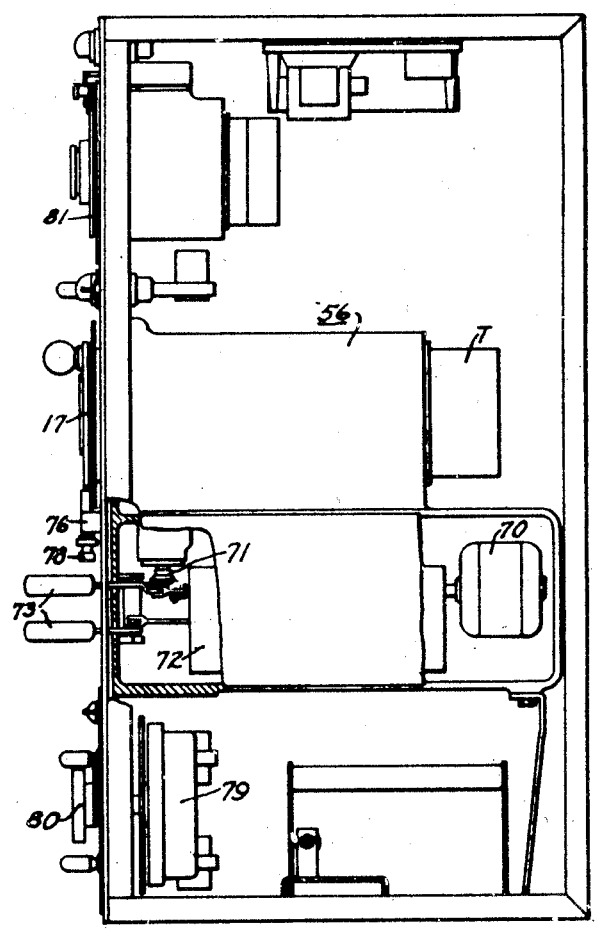
Fig. 3
Fig. 4

INVENTORS
Clinton R. Hanna and
Edward R. Wolfert.
BY
Paul E. Friedemann
ATTORNEY

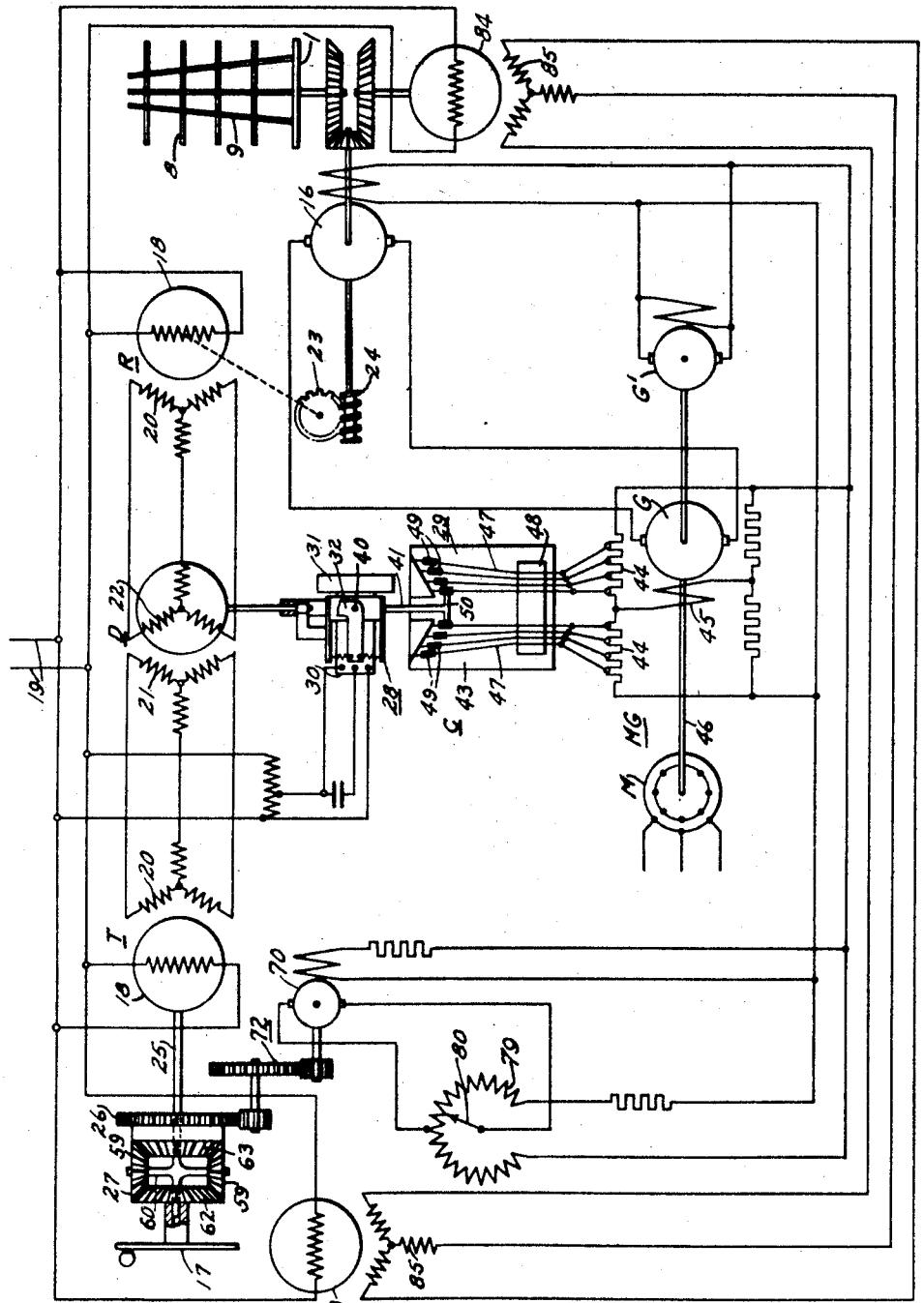

Patented Apr. 22, 1947

2,419,210

UNITED STATES PATENT OFFICE 2,419,210

POSITION REGULATOR

Clinton R. Hanna, Pittsburgh, Pa., and Edward R. Wolfert, Springfield, Mass., assignors to Westinghouse Electric Corporation, East Pittsburgh, Pa., a corporation of Pennsylvania Application March 31, 1943, Serial No. 481,190

10 Claims. (Cl. 172—239)

This invention relates to a position regulator and, more particularly, to an improved arrangement of apparatus for regulating the position of an antenna employed in connection with direction signalling radio apparatus of the ultra-high frequency type.

Radio installations of the ultra-high frequency type which are employed for the purpose of signalling or locating the position of objects in space require an antenna which may be selectively moved to different positions in azimuth. The antennae are usually too massive to be driven manually and power operated mechanisms are, therefore, provided for rotating the same to various positions. Such power operated drives are provided with follow-up means by which an operator can control the position of the antenna from a remote control station. The problem of providing a suitable form of power operated follow-up control is rendered difficult by reason of the inertia of the antenna due to its large size and mass and to the fact that the drive should be capable of moving the antenna from one position to another at varying rates of speed and should also be capable of stopping the antenna in a given position quickly regardless of the speed at which it is moving. A further factor rendering the control problem difficult is due to the fact that the antenna and drive therefor are exposed to the elements and thus temperatures which vary over a considerable range, in some cases such temperatures going to 50° below freezing or lower. These antennae also have large surface areas which when high wind velocities are encountered present forces which will either tend to resist movement of the antenna into a given position or will tend to cause movement of the antenna out of the position to which it has been moved.

One of the principal objects of this invention is to provide a drive for regulating the position of a directional antenna by which an operator may quickly move the antenna from one position to another with substantially no effort on the part of the operator and which is capable of holding the antenna in any position to which it is moved regardless of factors, such as wind forces and others, tending to move the antenna out of a given position.

A further object of this invention is to provide a novel form of electric drive for rotatable antennae by which the position of an antenna may be remotely controlled.

Another object of this invention is to provide a novel arrangement of synchro-tie electric control devices for controlling the operation of power mechanism which is employed to drive a rotatable antenna.

Another object of this invention is to provide power operating mechanisms for rotatable antennae having variable regulating means for effecting operation of the power operated mechanisms at varying speeds with control devices for effecting adjustments of the regulating mechanisms proportional to the velocity or rate of movement of a remotely located control member.

Another object is to provide in a drive of the character referred to, a gyroscope mounted in such manner as to give a regulating action on the antenna drive which is proportional to the rate of change of position of a remotely located control member to thereby provide a variable regulating force for driving the antenna into positional agreement with the control member.

Other objects and advantages of this invention will become apparent from the following description taken in connection with the accompanying drawings, in which:

Fig. 3 is a front elevational view of a control unit for remotely controlling the operation of the drive mechanism and thereby the position of the antenna shown in Figs. 1 and 2;

Fig. 4 is a side elevational view of the unit shown in Fig. 3, parts thereof being removed and broken away to show the location and arrangement of the various control devices therein;

Fig. 9 is a sketch diagrammatically illustrating the essential parts of the devices shown in the previous figures, together with the control circuits for such devices.

Figure 1:
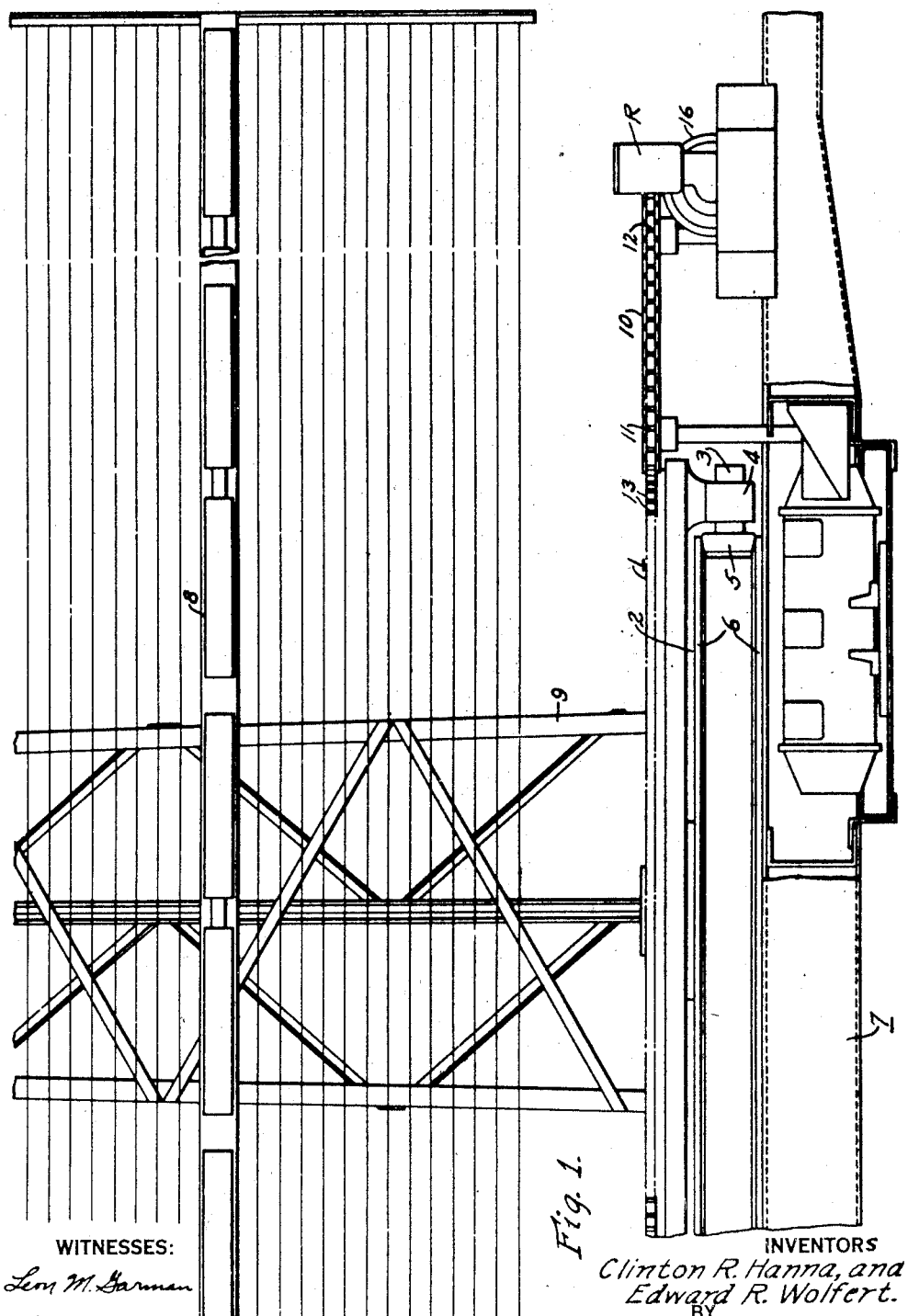
Figure 1 is a partial side elevational view of a directional antenna and its support showing the arrangement of the apparatus by which the antenna may be driven to different positions in azimuth.
Figure 2:
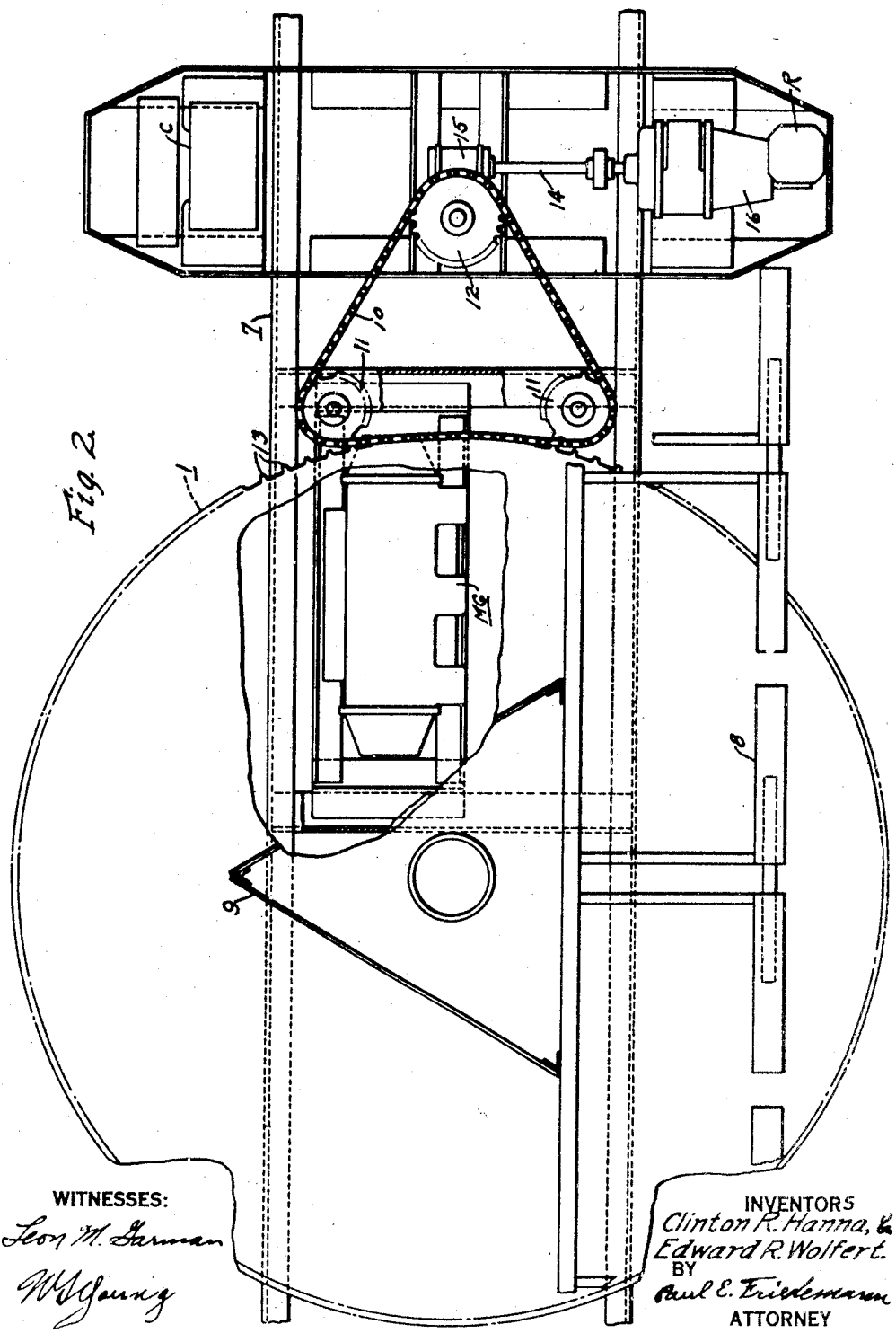
Fig. 2 is a top plan view of the apparatus shown in Fig. 1, parts thereof being broken away and shown in section.

Referring to Figs. 1 and 2 of the drawings, the numeral 1 indicates a platform rotatably mounted on a support 2 by means of shafts 3 journaled in members 4 depending from the platform 1. The shafts 3 are provided with rotatable guide rollers 5 which are positioned between guide flanges 6 on the support 2, the flanges 6 functioning to guide the movement of the rollers 5 in a circular path about the support 2. It is to be understood that a plurality of supporting guide rolls 5 and associated parts are provided for mounting the platform 1 on the support 2, there being only one of such rolls shown in Fig. 1 in the interest of simplicity. The support 2 is carried by a frame 7 which may either constitute a part of a permanent structure or a part of a chassis of a trailer vehicle which may be moved from point to point as desired.

A directional antenna 8 is mounted on a skeleton type mast 9 suitably secured to the platform 1. By rotating the platform 1 on its support 2, the mast and antenna carried thereby may be rotated to any selected position in azimuth.

A chain drive is provided for rotating the platform 1 on its support 2. This drive comprises a sprocket chain 10 having meshing engagement with idler sprockets 11 and a drive sprocket 12 carried by shafts rotatably supported on the frame 7. The periphery of the platform 1 is provided with sprocket teeth 13 for engagement with the chain 10, as best shown in Fig. 2. A drive shaft 14 is provided with a suitable mechanical connection 15 for driving the sprocket wheel 12, the shaft 14 being driven from a direct current drive motor 16 mounted on the frame 7. A motor generator set MG mounted on the frame 7 is provided for supplying current to the motor 16. The energization of the motor 16 by the motor generator set MG for the purpose of imparting rotary motion to the platform 1 and the antenna carried thereby is under the control of a control unit C, the structure and function of which will be referred to later.

Referring now to Fig. 9 wherein all the essential elements for regulating the position of the antenna 8 are shown, it will be noted that there is provided a synchro-tie control system intermediate the drive motor 16 and a manual control element 17. The synchro-tie system comprises a transmitter element T, a receiver element R and a differential element D. The transmitter and receiver elements T and R each comprise single-phase rotors 18, the windings of which are energized from a suitable source of alternating current such as the buses 19, and polyphase stator windings 20. The stator windings 20 are connected with each other through the polyphase stator winding 21 and polyphase rotor winding 22 of the differential element D.

The rotor 18 of the receiver element R is provided with a direct mechanical connection to the drive motor 16 by means of a worm gear connection comprising a worm wheel 23 and a worm gear 24. In this manner, the rotor 18 of the receiver R is driven by the drive motor 16 and any change in position of the antenna 8 is effective to cause an angular change in the position of the rotor 18 of the receiver R.

The rotor 18 of the transmitter T is mounted on a shaft 25 which is adapted to be driven either by the manual control 17 or a power driven gear 26 through a differential gear unit 27 in a manner to be described. In this manner, the shaft 25 drives the rotor 18 of the transmitter T to effect desired changes in the position of the antenna 8.

By reason of the mechanical connections thus far described, the rotor of the transmitter T represents the desired position of the antenna 8 and the rotor of the receiver R represents the actual position of the antenna 8. Whenever there is an angular difference between the rotors of the transmitter and receiver elements, the electrical connections between such elements provided by the differential element D will function to move the rotor 22 to a position representing the angular difference in the positions of the rotors of the transmitter and receiver element. This movement of the rotor 22 is utilized to effect operation of the motor 16 to drive the antenna 8 and thereby the rotor 18 of the receiver element R back into positional agreement with the rotor element 18 of the transmitter T in a manner to be described.

Figure 8:
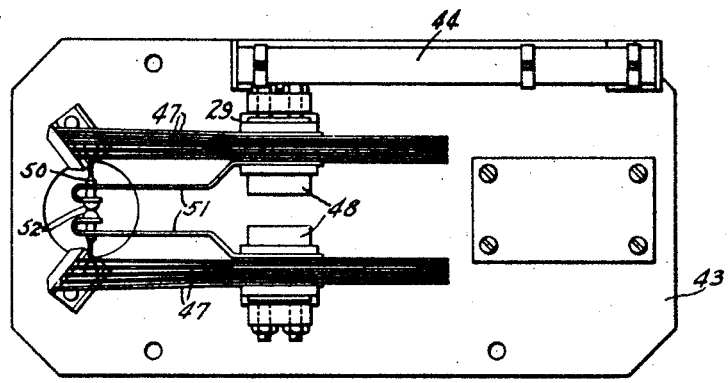
Fig. 8 is a plan view of a part of the variable resistance control shown in Fig. 7.
Figure 7:
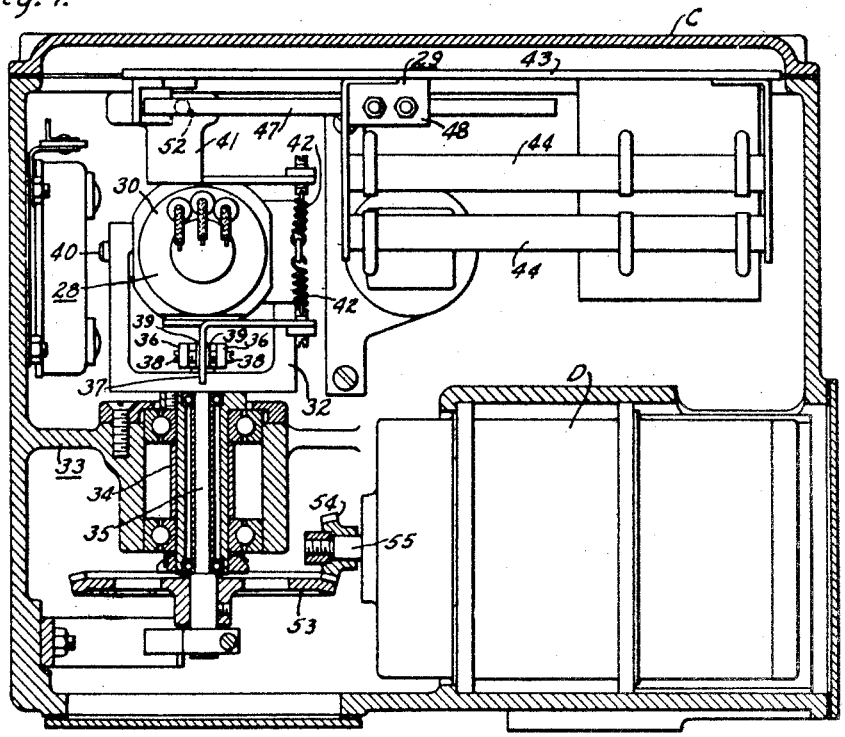
Fig. 7 is a side elevational view, parts thereof being broken away and shown in section, of the regulating device for controlling the operation of the drive motor and which functions to introduce a regulating action proportional to the velocity or rate of change in position of the control devices shown in Figs. 3 through 6.

The manner in which the rotor 22 of the differential element D functions to control the operation of the motor 16 will be best understood by considering the showing of Figs. 7 and 8 in connection with the showing of Fig. 9. From Fig. 7, it will be noted that the differential D is mounted in the housing of the control unit C. Generally speaking, the essential parts of the unit C comprise a gyroscope indicated as a whole by the numeral 28 and a variable resistance means indicated as a whole by the numeral 29. Change in position of the differential element D is made to disturb the position of the gyroscope 28 which in turn varies the resistance 29 to effect desired operation of the motor 16.

The gyroscope employed is of the neutral type and comprises a housing or inner frame 30 containing an electric motor for driving an inertia flywheel 31, as best shown in Fig. 9. As shown in Fig. 7, the housing or inner frame 30 is pivotally supported by the upwardly projecting arms of a yoke member or outer frame 32 so that its axis of spin is perpendicular to the plane of Fig. 7. By mounting the gyroscope in this manner it will have a precessional movement about an axis in the plane of Fig. 7 passing through the points of pivotal connection of the casing 30 to the upwardly projecting arms of the yoke member 32 upon a disturbance in the position of the gyroscope due to rotational movement of the yoke member 32. The yoke 32 and gyroscope supported thereby are mounted for free rotation on the casing 33 of the unit C by a bearing unit 34.

Rotation is imparted to the yoke 32 by means of a shaft 35 positioned centrally of the bearing unit 34 and having a pair of arms 36 secured to the upper end thereof. The arms 36 straddle a member 37 secured to and depending from the gyroscope casing 30. Each of the arms 36 is provided with an adjusting screw 38 adjustably supporting a brake shoe 39 engageable with a lateral surface of the member 37. In this manner the arms 36 carry brake shoes engageable with opposite surfaces of the member 37. Upon rotation of the shaft 35 the arms 36 will be moved to cause engagement of one of the frictional members 39 with a surface of the braking member 39 secured to the gyroscope casing 30. This engagement will provide a torque for moving the yoke 32 to disturb or move the gyroscope axis of spin from the position occupied as shown in Fig. 7. As such movement takes place, the gyroscope will precess about its precessional axis which passes through its points of pivotal support 40. This precessional movement is utilized to move a resistance adjusting member 41 which is secured to and projects upwardly from the casing 30. A pair of springs 42 are connected to the inner frame so as to be effective about the precession axis. As angular velocity of the differential output member or shaft 35 is accompanied by proportional torque of the gyro about the precession axis, the scale effect of the spring means assures of an angle of movement of the gyro about the precession axis which is proportional to the angular velocity of the shaft or member 35. Not only does the spring means provide for an angle of movement about the precession axis which is a measure of the angular velocity of the differential output member, but such means serves to center the gyro about the precession axis.

The resistance unit 29 is secured to the underside of the plate 43 mounted at the top of the casing 33. The resistance unit 29 controls the output of the generator G of the motor generator MG and thereby the operation of the antenna drive motor 16. The unit 29 includes a pair of resistances 44 arranged in a potentiometer circuit with respect to the field 45 of the generator G as shown in Fig. 9. The field 45 is excited by means of a generator G' which is driven by the motor M through a common shaft 46 which also drives the generator G. Two separate sets of flexible conductors 47 are secured to the underside of the plate 43 by insulating devices 48. The devices 48 also function to insulate the flexible conductors in the sets 47 from each other. As best shown in Fig. 9, the lower ends of the conductors in each of the sets 47 are connected to the resistances 44 at spaced points. The upper ends of the conductors in each of the sets 47 are provided with silver contact buttons 49 by which the flexible conductors may be electrically connected to selectively shunt out portions of the resistance in either of the resistances 44. The buttons 49 are operated by means of members 50 mounted at the outer ends of spring arms 51 carried by the insulating supports 48. The resistance adjusting arm 41 projecting upwardly from the gyroscope casing 30 is adapted to be positioned between the buttons 52 at the inner ends of the actuating members 50, as best shown in Figs. 7 and 8. When the member 41 is positioned between the buttons 52, it is preferred that at least a portion of the contact buttons 49 on each of the sets of leaves 47 will be engaged. In this manner, upon movement of the member 41, resistance will be added to one side of the control circuit for the field 45, while simultaneously shunting out resistance from the other side of its control circuit. Such arrangement will provide a push-pull arrangement of resistance and give a smoother action than will be had in the case where all of the buttons are disengaged prior to movement of the control member 41 as indicated in the diagrammatic showing of Fig. 9. It is to be understood that all the buttons may be either disengaged as shown in Fig. 9 or may be initially partially engaged as will be had by the construction shown in Fig. 7.

Current will flow through the field 45 in a direction depending upon which of the resistances 44 is shunted out, the resistance shunted being dependent upon the direction of movement imparted to the operating member 41 carried by the gyroscope. The precessional movement of the operating member 41 will be either clockwise or counterclockwise according to the initial movement of the shaft 35. The shaft 35 is operated by means of a spur gear 53 keyed to its lower end and in mesh with a pinion 54 mounted on a shaft 55 to which is also secured the rotor 22 of the differential synchro-tie element D.

Figure 5:
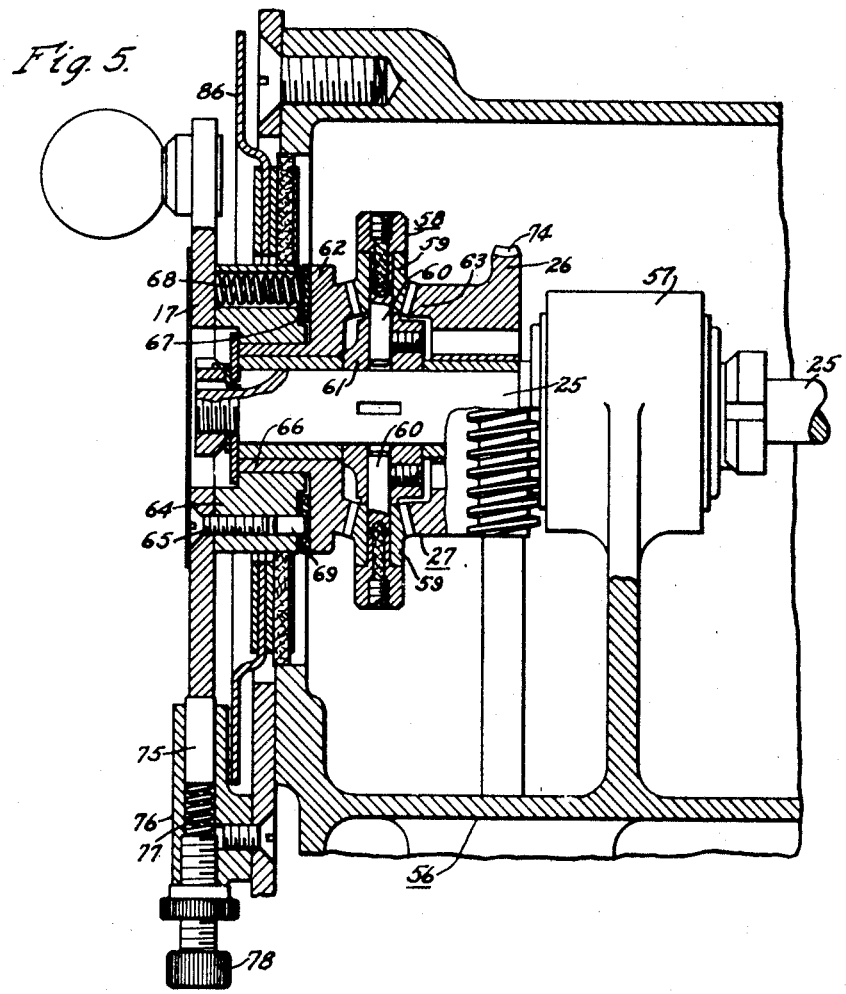
Fig. 5 is an enlarged vertical sectional view of mechanism which may be manually or power operated to remotely control the position of the rotatable antenna.
Figure 6:
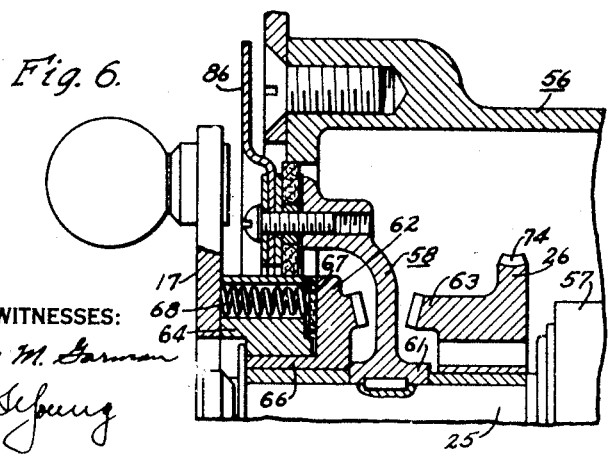
Fig. 6 is a partial view similar to that of Fig. 5 showing the manner in which the indicating dial is connected to the mechanism shown in Fig. 5.

The manner in which the shaft 25 is operated to control the position of the transmitter rotor 18 will be best understood by referring to Figs. 5 and 6. In this showing, the shaft 25 is rotatably supported in the control box 56 by a bearing 57. The shaft 25, as pointed out above, is driven by a differential gear unit 27. The unit 27 comprises a gear cage 58 having bevel pinions 59 rotatably mounted on shafts 60 carried by a hub 61 keyed to the shaft 25. The bevel pinions 59 mesh with bevel gears 62 and 63 rotatably mounted on the shaft 25. Upon relative movement between the gears 62 and 63, the gear cage 58 will be rotated to impart movement to the shaft 25 and thereby the rotor 18 of the transmitter synchro-tie element 18.

The bevel gear 62 is driven by the manual control member 17 through a frictional drive comprising an annular member 64, secured to manual control member 17 by screws 65 and rotatably mounted on the hub 66 of gear 62, and a frictional drive member or clutch disc 67. The frictional drive member 67 is biased into engagement with a side surface of the gear 62 by springs 68. Dowel pins 69 serve to secure the clutch plate or frictional drive member 67 to the member 64 for rotation therewith. Upon rotation of the member 64 by the manually operated member 17, the clutch disc 67 will impart rotational movement to the gear 62 by reason of its frictional engagement therewith. The mounting of the disc 67 provided by the dowel pins 69 and springs 68 limits the torque that can be transmitted to the gear 62 and thereby the speed of movement of the gear 62. In the event that a torque is applied to the member 17 tending to drive the gear 62 at too fast a speed, the clutch disc 67 will slip and move relatively to the gear 62.

The gear 63 is adapted to be driven from a variable speed motor 70 by speed reduction gearing as diagrammatically shown in Fig. 9, in which showing the gear 26 corresponds to the gear 63 of Fig. 5. Actually, as shown in Fig. 4, the motor 70 drives a shaft 71 through a speed reduction transmission 72 which is operated by controls 73 to provide a plurality of speed ratios between the shaft 71 and the motor 70. The details of the transmission 72 form no part per se of this invention and have not been illustrated. A worm gear is provided at the upper end of the shaft 71 for meshing relationship with the worm gear teeth 74 on the gear 63 in order that rotation of the shaft 71 may impart rotation to the gear 63.

In order that rotation of either of the gears 62 or 63 may impart rotation to the gear cage 58 and thereby the shaft 25, it is necessary that one of such gears be held stationary. In the case of manual operation, the friction of the gears connected to the gear 63 will be effective to prevent operation of such gear. However, in the event of automatic operation, it is necessary to lock the gear 62 against movement if rotation of gear cage 58 is to be indicative of rotation of gear 63. This is accomplished by means of a holding device 75 mounted in a support 76 secured to the control housing. The device 75 is held in engagement with the control member 17 by a spring 77. An adjusting screw 78 is provided for varying the tension of the spring 77 and thereby the amount of force exerted on the control member 17 by the device 75 to hold such member against movement.

As best shown in Fig. 9, the armature of the motor 70 is connected across a potentiometer 79 which has its terminals connected to the generator G'. By changing the position of the manual potentiometer control member 80, the voltage supplied to the motor 70 may be varied to vary its speed of operation or to reverse its speed of operation. As will be seen from Fig. 3, the control member 80 is located conveniently outside of the control panel. The member 80 cooperates with the mechanical speed change transmission 72 under the control of shift levers 73 to provide a wide variation in the speed of operation of the gear 63. This arrangement in actual installations will provide a speed of operation for the antenna 8 which may be varied from several revolutions per minute to one revolution in several hours.

A dial 81 is mounted on the front of the control panel for indicating the exact position in azimuth of the antenna 8. The dial cooperates with indicia 82 marked on the surface of the control panel to indicate in degrees the position of the antenna. The dial 81 is mounted on a shaft carrying the rotor of a synchro-tie receiving element which cooperates with a synchro-tie transmitting element as best shown in Fig. 9. In this showing, the rotor 83 of the receiving element has a single phase winding which is energized by connections to the alternating current buses 19. The rotor 84 of the transmitting element is provided with a one-to-one mechanical connection to the antenna 8 and also has a single phase winding which is energized by connections to the alternating current buses 19. Each of the rotors 83 and 84 cooperates with polyphase stator windings 85 which are electrically connected. By this arrangement, rotation of rotor 84 due to movement of the antenna 8 will effect an equal rotation of the rotor 83 and the indicating dial carried thereby to indicate the position of the antenna 8.

In order that the position of the antenna may be accurately controlled, a second indicating dial 86 having indicia marked thereon for cooperation with a pointer 87 is mounted on the control panel. The dial 86 is connected directly to the hub 61 carrying the gear cage 58 as best shown in Fig. 6. In this manner, a complete revolution of the shaft 25 and gear cage 58 carried thereby effects one complete revolution of the dial 86. The drive and indicia of the dials 86 and 81 are correlated with each other. Preferably, and as shown in Fig. 3, the indicia 82 is so arranged that each mark equals 5° and the dial 86 and its drive is so designed that one complete revolution thereof is equivalent to a 5° antenna movement. In this manner, the position of the antenna may be easily read to within a few minutes of its actual position.

The operation of the apparatus is as follows:

Upon movement of the shaft 25, due to either manual or power operation thereof as described above, the rotor 18 of the transmitter T will be displaced with respect to the rotor 18 of the receiver R and the rotor 22 of the differential D will follow the transmitter T and move to a position representing the angular difference in positions of the displaced rotors 18. Such movement of the rotor D, through shaft 55, gears 54 and 53, will turn the shaft 35 and thereby the yoke 32 through the bracket members 36 and depending member 37. From Fig. 7, it will be noted that turning movement of the yoke 32 about its vertical axis will carry with it the gyroscope and member 41 will actuate the buttons 52 to effect an adjustment of the resistance since the buttons are offset from the vertical turning axis of the yoke 32. This adjustment is proportional to the angular movement of shaft 35 and angular difference of the positions of the rotors 18 in synchro-ties T and R.

In addition to this adjustment, which may be considered a physical adjustment since it is proportional to physical displacement of rotors 18, the gyroscope provides an adjustment which is anticipatory and precedes such physical adjustment. This anticipatory adjustment takes place as long as the shaft 35 is changing position and is proportional to the velocity of its movement. Assuming that the rotors 18 are moving out of angular agreement, the shaft 35 will start turning to move the yoke 32. Further assuming this movement to be in a clockwise direction as viewed in Fig. 7, the gyroscope will precess in a clockwise direction about the pivots 40 and through the member 41 will effect an adjustment preceding the above-mentioned physical adjustment. The gyroscope thereby provides an anticipating or anti-hunting effect for causing motor 16 to drive the rotors 18 into positional agreement. When the shaft 35 stops moving, the springs 45 return the gyroscope to its original position leaving only the physical adjustment provided corresponding to the position of yoke 32. Assuming now that motor 16 operates to remove the displacement of the rotors 18, the shaft 35 will move and have a velocity of movement in an opposite direction. The gyroscope will then precess in a counterclockwise direction proportional to the velocity of movement of the shaft 35. The motor 16 will thus be deenergized or energized in an opposite direction to provide a braking effect and thus prevent the rotor 18 of the receiver R over-shooting or over-running a position in angular agreement with the other rotor 18.

By utilizing the precessional movement of the gyroscope 28 to control the energization of the motor 16, a control effect is had which is not dependent alone on the extent of positional disagreement of the rotors 18. The gyro provides an anticipating control effect or "energization" of the motor 16 which is proportional to the velocity at which the rotors 18 are moving out of or into positional agreement. In other words, the anticipating control is one proportional to the rate at which the positions of the rotors 18 are changing. The presence of the anticipating control permits the angular positional control, as represented by rotation of the shaft 35, to be made greater without incurring instability or hunting of the regulator. The result is smaller deviations between input and output members for disturbances which cause such deviations.

The control for the antenna 8 is also automatically effective to hold the antenna in any position to which it is moved as against forces due to high velocity winds striking the antenna surfaces. Movement of the antenna by such forces will be immediately transmitted to the rotor 18 of receiver R and the rotor 22 of the differential D will be operated to cause the gyroscope 28 to act through the variable resistance 29 to return the antenna to its intended position. If the force persists, a continued energization of the motor 16 effective to prevent movement of the antenna 8 will be applied.

Referring to Fig. 7, it will be noted that the manner in which the friction members 39 apply a torque to the depending member 37 is also effective to frictionally damp precessional movements of the gyroscope. By this arrangement, the damping of the gyroscope precessional movements is proportional to the torque applied by the shaft 35 to the yoke 32 for causing such precessional movements.

Certain parts of this invention are shown and described in the copending application of J. H. Broadbent, Serial No. 490,045, filed June 8, 1943. Also the follow-up arrangement employing a differential in general with the gyro is disclosed and claimed in the patent of Hanna, Mikina and Lynn, No. 2,385,203, granted September 18, 1945.

Since certain changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. In a drive for directional antennae, in combination, a directional antenna, a rotatable support for said antenna, an electric motor for rotating said support, a control element, a differential synchro-tie system comprising transmitter elements connected to said control element and to said antenna support and a differential element electrically connected to said transmitter elements whereby said differential element will move in accordance with relative changes in angular position of said transmitter elements, variable regulating means for operating said motor at varying speeds, a gyroscope having first and second axes which are transverse to each other and to the spin axis, means connecting said differential element to said gyroscope for displacing the same about said first axis to develop torque about the second axis, and means responsive to movement of the gyroscope about the first axis and to torque thereof about the second axis to adjust said regulating means for operation of the motor to drive said rotatable support and antenna carried thereby into positional agreement with said control element.

2. In a drive for directional antennae, in combination, a directional antenna, a rotatable support for said antenna, an electric motor for rotating said support, a control element, remote electrical control means comprising a synchro-tie unit responsive to the position of said control element and a synchro-tie unit responsive to the position of said antenna, variable regulating means for operating said motor at varying speeds, a gyroscope having first and second axes which are transverse to each other and to the spin axis, means responsive to positional disagreement of said synchro-tie units for displacing said gyroscope about said first axis to develop torque about the second axis, and means responsive to movement of the gyro about the first axis and to torque thereof about the second axis to adjust said regulating means for operation of the motor to drive said antenna into positional agreement with said control element.

3. In a drive for directional antennae, in combination, a directional antenna, a rotatable support for said antenna, an electric motor for rotating said support, a control element, displacement means differentially responsive to the position of said control element and the position of said antenna, variable regulating means for operating said motor at varying speeds, a gyroscope having first and second axes which are transverse to each other and to the spin axis, means connecting said displacement means to said gyroscope for displacing the same about said first axis to develop torque about the second axis, means for opposing movement of the gyroscope from centered positioned about the second axis with increasing force, and means responsive to movement of the gyroscope about the first and second axes to vary said regulating means for operation of said motor to drive said antenna into positional agreement with said control element.

4. In a control system for directional antennae, in combination, a directional antenna, a rotatable support for said antenna, a motor for rotating said support, a control device, variable regulating means for operating said motor at varying speeds, a gyroscope having first and second axes which are transverse to each other and to the spin axis, means responsive to positional disagreement of said antenna and control device for displacing said gyroscope about said first axis to develop torque about the second axis, and means responsive to movement of the gyro about the first axis and to torque thereof about the second axis to adjust said regulating means for operation of said motor to drive the antenna and to remove positional disagreement of said antenna with respect to said control device.

5. In a control system, a control element, an object the position of which is to be regulated in accordance with changes in the position of said control element, a motor for driving said object, a differential synchro-tie system comprising transmitter elements connected to said control element and to said object and a differential element electrically connected to said transmitter elements whereby said differential element will move in accordance with relative changes in angular position of said transmitter elements, variable regulating means for operating said motor at varying speeds, a gyroscope having first and second axes which are transverse to each other and to the spin axis, means connecting said differential element to said gyroscope for displacing the same about said first axis to develop torque about the second axis, spring means for opposing movement of the gyro from centered position in opposite directions about the second axis, and means responsive to movements of the gyroscope about the first and second axes to adjust said regulating means for operation of the motor to drive said object into positional agreement with said control element.

6. In a control system, a control element, an object the position of which is to be regulated in accordance with changes in the position of said control element, a motor for driving said object, remote electrical control means comprising a synchro-tie unit responsive to the position of said control element and a synchro-tie unit responsive to the position of said object, variable regulating means for operating said motor at varying speeds, a gyroscope having first and second axes which are transverse to each other and to the spin axis, means responsive to positional disagreement of said synchro-tie units for displacing said gyroscope about said first axis to develop torque about the second axis, and means responsive to movement of the gyroscope about the first axis and to torque thereof about the second axis to adjust said regulating means for operation of the motor to drive said object into positional agreement with said control element.

7. In a drive for directional antennae, in combination, a directional antenna, a rotatable support for said antenna, an electric motor for rotating said support, a rotatable control element, a differential including a pair of input elements operatively connected to the rotatable support and to the control element and a rotary output element, a gyroscope mounted for displacement about one axis and for precessional movement about a second axis, means for connecting said output element to the gyroscope to move the latter about said one axis, variable regulating means for operating said motor at varying speeds, and means including a precessionally-moved part carried by the gyro in eccentric relation with respect to said one axis for varying said regulating means to operate said motor to maintain said antenna in positional agreement with said control element.

8. In a control system, a control element, an object the position of which is to be regulated in accordance with changes in the position of said control element, a motor for driving said object, remote electrical control means comprising a synchro-tie unit responsive to the position of said control element and a synchro-tie unit responsive to the position of said object, variable regulating means for operating said motor at varying speeds, a gyroscope mounted for displacement about a first axis and for precessional movement about a second axis at right angles to said first axis and to the spin axis, means responsive to positional disagreement of the synchro-tie units and including a coupling for displacing the gyroscope about said first axis, said coupling having abutment surfaces which are engageable to transmit torque about said first axis and are arranged to provide for precessional movement of the gyroscope about said second axis, and a precessionally-moved part carried by the gyroscope in eccentric relation with respect to said first axis and cooperating with said regulating means to render the motor effective to drive said object into positional agreement with said control element.

9. In a drive for directional antennae, in combination, a directional antenna, a rotatable support for said antenna, an electric motor for rotating said support, a control element, a differential synchro-tie system comprising transmitter elements connected to said control element and to said antenna support and a differential element electrically connected to said transmitter elements and including an output member movable angularly in response to angular disagreement of the transmitters, a gyroscope having first and second axes which are transverse to each other and to the spin axis, means for connecting the output member to the gyroscope to move the latter angularly about the first axis to develop torque about the second axis, and means for controlling the motor in response to torque of the gyro about the second axis to drive the rotatable support and antenna so as to minimize positional disagreement between the latter and said control element.

10. In a control system, a rotary control element, an object rotatable about an axis, a motor for driving said object, a differential synchro-tie system comprising transmitter elements connected to said control element and to said object and a differential element electrically connected to said transmitter elements and including an output member movable angularly in response to angular disagreement of the transmitter elements, variable regulating means controlling said motor for operation thereof at varying speeds, a gyroscope having first and second axes which are transverse to each other and to the spin axis, means for connecting the output member to the gyroscope to move the latter angularly about the first axis to develop torque about the second axis, spring means acting on the gyroscope about the second axis and opposing movement thereof from centered position, and means for operating said regulating means in response to movement of the gyroscope about the second axis for operation of said motor to minimize positional disagreement of said object with said control element.

CLINTON R. HANNA.
EDWARD R. WOLFERT.

REFERENCES CITED

The following references are of record in the file of this patent:

UNITED STATES PATENTS

| Number | Name | Date |
| --- | --- | --- |
| 1,692,051 | Patterson | Nov. 20, 1928 |
| 2,157,817 | Crago | May 9, 1939 |
| 2,176,101 | Riggs | Oct. 17, 1939 |

FOREIGN PATENTS

| Number | Country | Date |
| --- | --- | --- |
| 702,932 | French | Apr. 21, 1931 |